Nov. 29, 1949     H. SIEB     2,489,825
MACHINE FOR CUTTING INDEX NOTCHES IN BOOK EDGES
Filed April 19, 1947     8 Sheets-Sheet 1

Nov. 29, 1949 — H. SIEB — 2,489,825
MACHINE FOR CUTTING INDEX NOTCHES IN BOOK EDGES
Filed April 19, 1947 — 8 Sheets-Sheet 4

Inventor.
Henry Sieb.
By Wm F. Freudenreich
Attorney.

Nov. 29, 1949 H. SIEB 2,489,825
MACHINE FOR CUTTING INDEX NOTCHES IN BOOK EDGES
Filed April 19, 1947 8 Sheets-Sheet 6

Inventor.
Henry Sieb,
By Wm F. Freudenreich,
Attorney.

Nov. 29, 1949     H. SIEB     2,489,825
MACHINE FOR CUTTING INDEX NOTCHES IN BOOK EDGES
Filed April 19, 1947     8 Sheets-Sheet 7

Inventor.
Henry Sieb,
By Wm F Freudenreich,
Attorney.

Nov. 29, 1949     H. SIEB     2,489,825
MACHINE FOR CUTTING INDEX NOTCHES IN BOOK EDGES
Filed April 19, 1947     8 Sheets-Sheet 8

Inventor.
Henry Sieb.
By Wm F Freudenreich,
Attorney.

Patented Nov. 29, 1949

2,489,825

UNITED STATES PATENT OFFICE 2,489,825

MACHINE FOR CUTTING INDEX NOTCHES IN BOOK EDGES

Henry Sieb, Hammond, Ind.

Application April 19, 1947, Serial No. 742,505

14 Claims. (Cl. 164—48)

Although the practice of cutting "thumb notches" in the edges of books, for indexing purposes, is very old, little progress has heretofore been made toward notching advantageously by machinery.

The present invention has for its main object to produce a simple and novel machine by which books of any size may be notched rapidly and accurately, with little effort on the part of the operator, and in a manner to achieve uniformity with respect to an indefinite number of like books.

The various features of novelty whereby the present invention is characterized will hereinafter be pointed out with particularity in the claims, but, for a full understanding of the invention and of its objects and advantages, reference may be had to the following detailed description taken in connection with the accompanying drawings, wherein:

Referring to the drawing, 1 is a heavy, flat, rectangular, metal plate mounted on and forming a closure for the top of a cabinet 2. Mounted on top of the bed or table, about midway between the ends and toward the rear thereof, is a sturdy upright or column 3. A hollow head 4 is mounted on the front side of the column for vertical sliding movements from and toward the bed or table. The head is suspended from one end of a chain 5 that extends up to and over a sprocket wheel 6 mounted on top of the column; the other end of the chain being fastened to a cable 7 that emerges from the casing 8 of a self winding reel of any spring actuated conventional type. As shown in Fig. 2, this device may comprise an outer casing across the interior of which extends a stationary shaft 8ª, a spiral spring 8ᵇ surrounding and anchored at one end to the shaft, and a rotatable drum 8ᶜ which encloses the spring and to which the other end of the spring is anchored. The head is therefore normally yieldingly held raised, as in Figs. 1 and 2. On top of the column, besides the sprocket wheel, is a vertical, cylindrical casing 9 containing a plunger 10 that protrudes from the lower end thereof for engagement with the top of the head when the latter moves up. A compression spring 11 in the casing yieldingly resists upward movement of the plunger which, therefore, serves as a buffer for the head. The head is provided with a hollow arm 12 projecting forwardly therefrom and open on its under side.

In the column, behind the head 4, is an actuator in the form of a vertically slidable bar 14. On the front side and near the upper end of the actuator is a protruding block 15 of hard steel adapted to cooperate with a latch member 16 in the head to draw the head down. This latch member is mounted in the rear end of arm 12 on the head for rocking movements about a horizontal pivot pin 17 passing through the middle of the same, from and toward the actuator. When the upper end of latch member 16 is beneath block 15, as in Fig. 2, a downward movement of the actuator bar 14 produces a corresponding movement in the head.

On the forward end of arm 12 is mounted a carrier 18 for a cutter or knife of the gouge chisel type, namely, trough shaped with a transverse cutting edge at one end. The carrier is a rocker device supported between its ends on a pivot pin 20 that is parallel to pin 17. The lower ends of elements 16 and 18 are connected together by a lengthwise adjustable connecting rod 21, so that they must rock in unison with each other. Surrounding such connecting rod is a compression spring 22 that abuts at its forward end against an adjustable collar 24 on the rod and, at its rear end, against a plate 25 that is fastened to arm 12 and through which the rod passes. This spring constantly exerts a yielding pressure on the connecting rod in the direction to pull the lower end of latch member 16 forward while the upper end swings rearwardly into the path of block 15 on the actuator. A set screw 26, carried at the upper end of the knife carrier, normally engages a shoulder 27 on arm 12, to prevent the upper end of the rockable latch member from swinging too far in the rearward direction. The lower end of the knife carrier contains a vertical, cylindrical socket 28, open at its lower end. The stem 29 of a knife holder 30 fits in this socket and is held in place by a set screw 31. The body portion of the tool holder terminates in a trough-like part 32 that forms a seat into which the knife fits. Cooperating with this trough-shaped part of the holder is semicylindrical block 34 that is adapted to be nested in the trough of the knife; so that, when a screw 35 is passed through part 32 and the knife into this block, the knife is firmly clamped between these two holder elements. The parts are so proportioned that the knife normally slants downwardly and rearwardly at an angle of about 45°; the lower end being shaped to bring the entire lower end edge into a plane parallel with the top of the bed or table.

It will be seen that latch member 16 is, in effect, a spring pressed pawl which provides a positive driving connection between the actuator and the sliding head when the actuator moves down from the raised position shown in Fig. 2; this being due to the fact that pivot pin 17 is placed well forward from the path of travel of block 15 on the actuator, so that the upper half of latch member 16 inclines upwardly and rearwardly and cannot slip out from under the block. Consequently, whenever the actuator pulls the head down, both will travel through the length of the stroke of the actuator unless the rocking latch member is tripped before a full down stroke is completed. In the operation of the machine the latch tripping is done by a book into which a notch is being cut, and which lies flat on the bed or table as will now be explained.

On the bed or table are a pair of aligned longitudinal guides 36 and 37 located in front of the column 3 in a vertical plane that is crossed by the entire cutting edge of the knife in making a cutting stroke. The two guides are spaced apart from each other far enough to allow the knife to move freely through the space between them.

Figure 6:
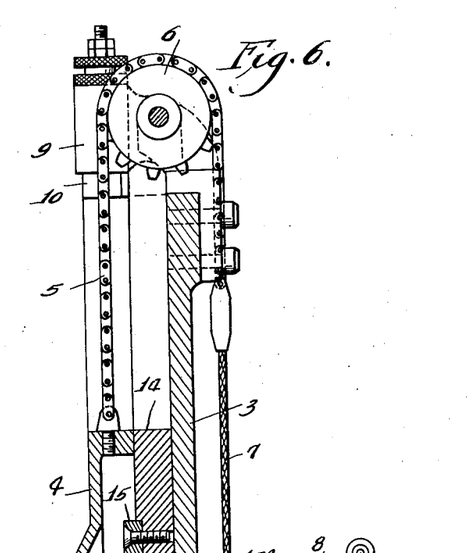
Fig. 6 is a view similar to Fig. 2, showing the parts in the positions which they occupy just as a notch is being completed.
Figure 7:
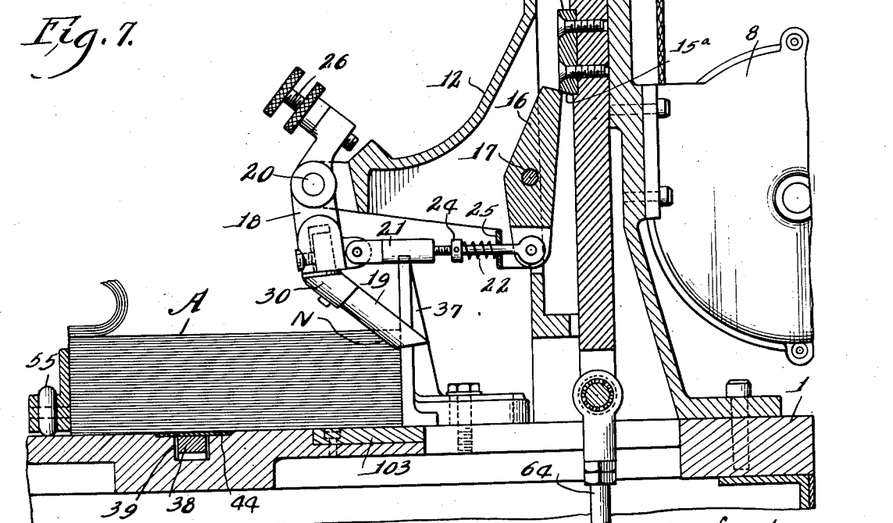
Figs. 7 and 8 are, respectively, an edge view and a top plan view of a shoe by which a book may be held in position while in the machine.
Figure 8:
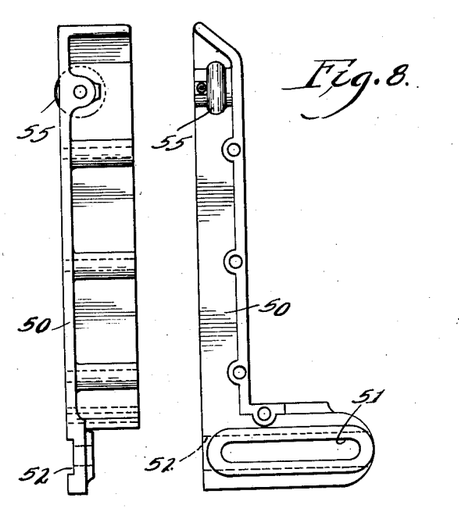
Figures 9, 10, 11:
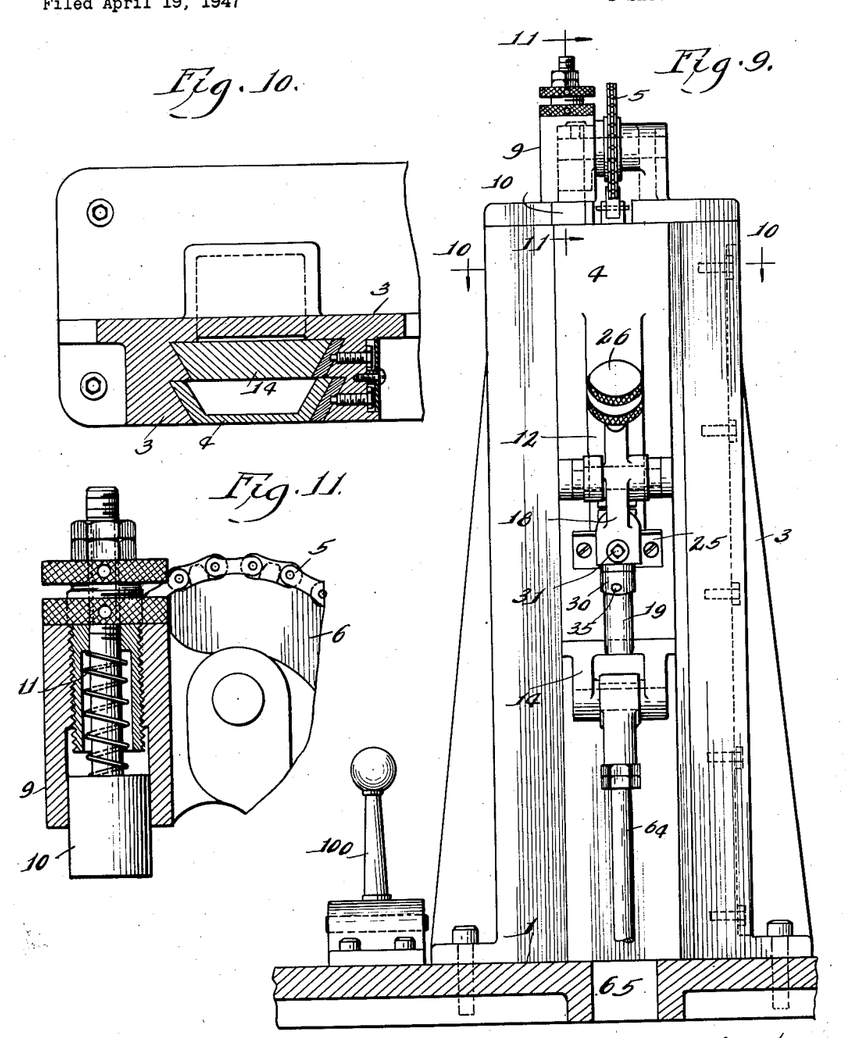
Fig. 9 is a front view of that portion of the machine shown in Fig. 2, with the parts in the same positions as in that figure.
Fig. 10 is a section on line 10—10 of Fig. 9, showing only the stationary column or upright and the slides mounted thereon.
Fig. 11 is a section on line 11—11 of Fig. 9 but on a larger scale than the latter.
Figure 12:
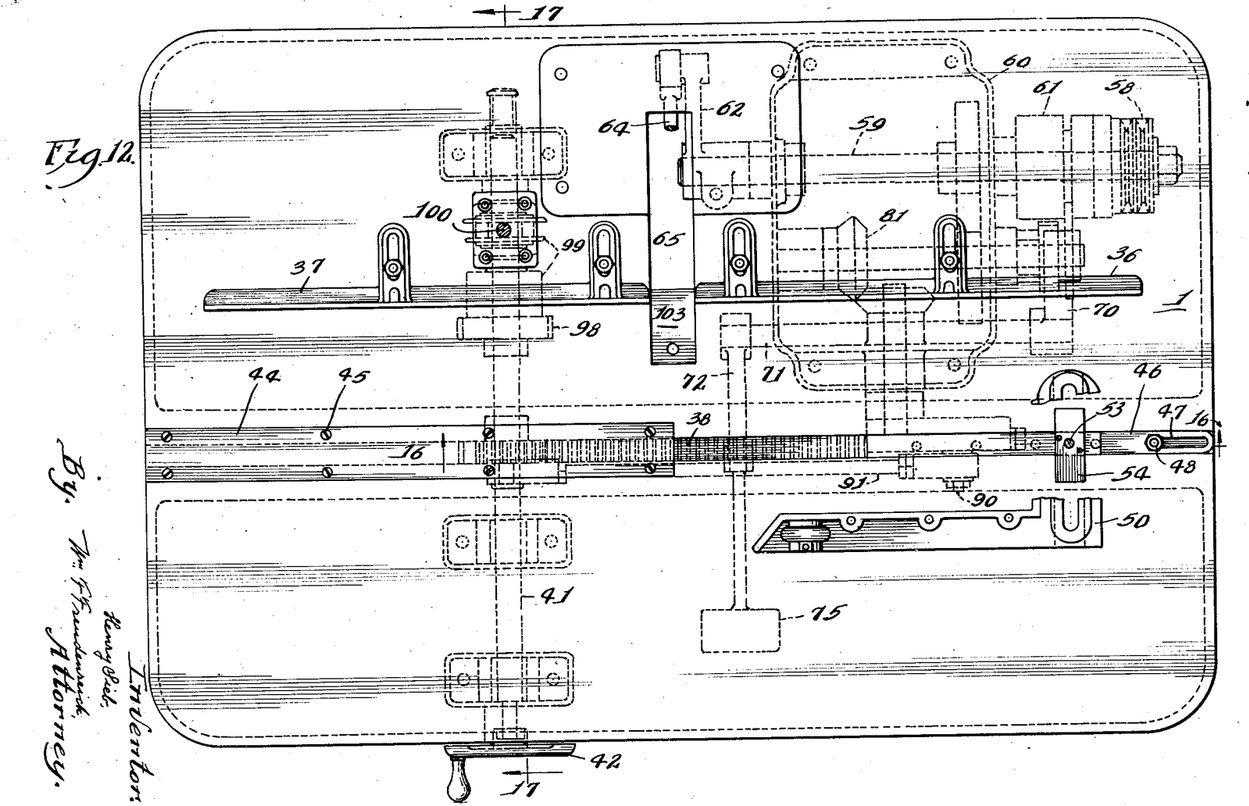
Fig. 12 is a top plan view of the machine with the column and parts supported thereon omitted.
Figure 13:
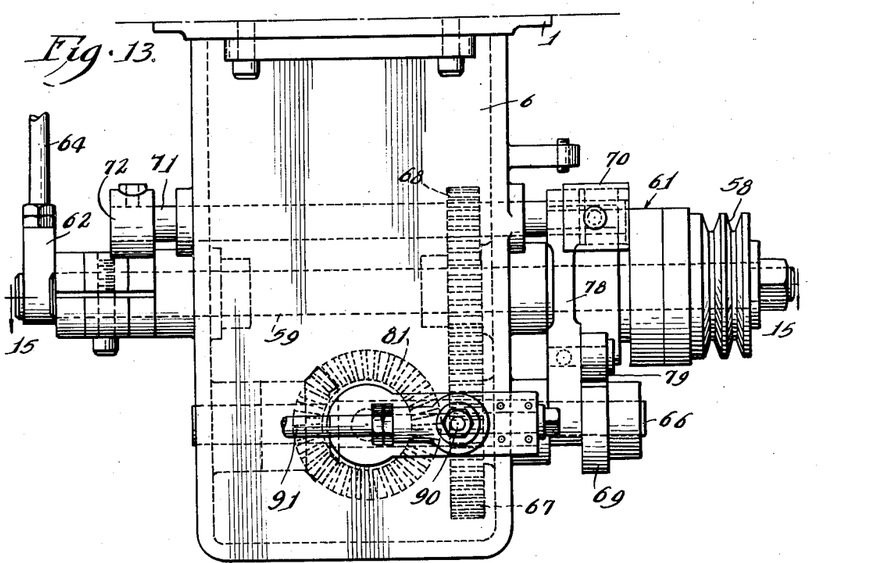
Fig. 13 is an elevational view of the main transmission apparatus, as seen from the front of the machine.
Figure 14:
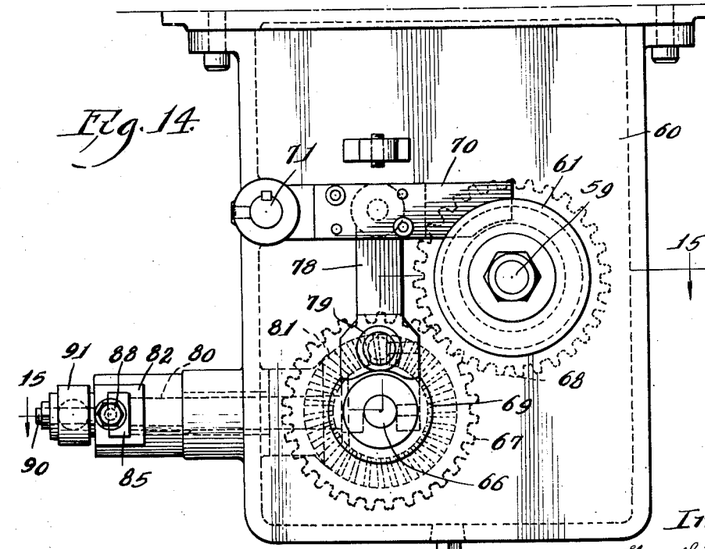
Fig. 14 is a view of the apparatus shown in Fig. 13, as seen from a point to the right of Fig. 13.
Figure 15:
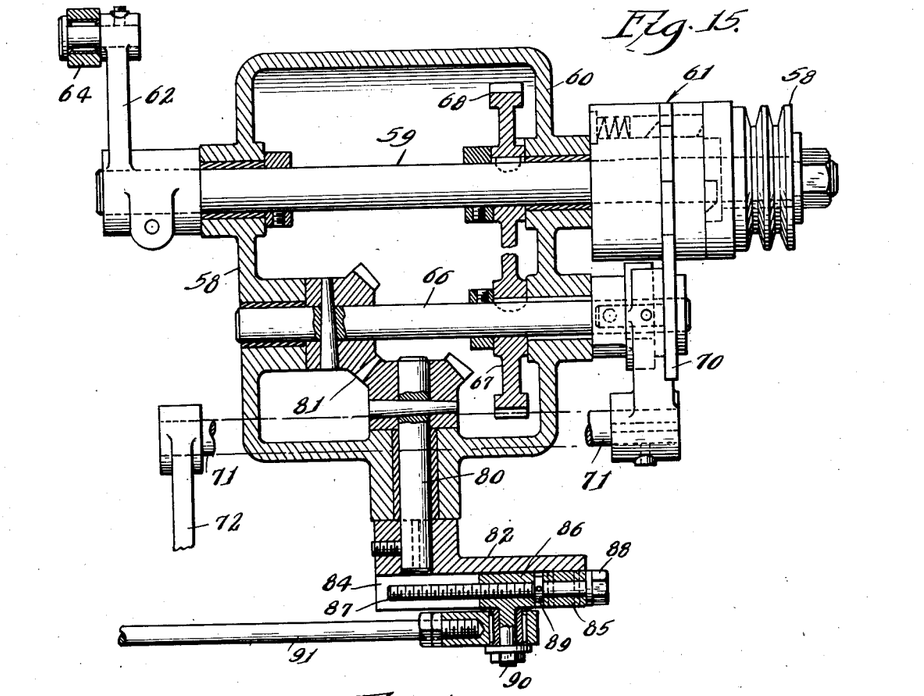
Fig. 15 is a section on the irregular line 15—15 of Fig. 14.

In operation, a book, such as A in Fig. 6, is placed on the table with the edge that is to be notched held against the guides. Then, when the head is drawn down, the knife is brought into contact with the upper side of the book at a predetermined distance from such edge and begins to cut into the same. The resistance offered by the book to penetration of the knife into the same results in rocking the knife and its carrier; the cutting edge being caused to travel rearwardly as well as downwardly, out through the vertical edge of the book. When the cutting of the notch has been completed, there is no longer any need for further downward movement of the head, and so it is automatically released from the actuator; moving up to its normal raised position as soon as it is released. The release is effected by tripping the latch. Obviously, when the knife rocks toward the rear of the machine the upper end of the carrier therefor rocks forwardly; and, since latch member 16 rocks in the same way as the carrier, its upper end moves forwardly to disengage it from the actuator. Thus, in Fig. 6 the knife is just about ready to emerge at the edge of the book, while latch member 16 has been rocked until it is almost out from under the shoulder formed by block 15 on the actuator. Now, only a small additional downward movement of the head is needed to rock member 16 far enough to carry it clear of such shoulder; the spring actuated reel then acting instantly to lift the head to its raised position. After the tripping of the latch the actuator continues to the end of its down stroke, as will be further explained, and then, as it comes to the end of its up stroke, it is again automatically latched to the sliding head.

While I am not certain that a critical condition is represented thereby, I have found that excellent results are obtained when the lower edge or shoulder 15ª of block 15 is at an angle of 13° to the horizontal, with the radial distance of the upper edge 16ª on member 16, relative to pivot pin 17 increasing slightly from front to rear.

It is usually necessary to cut more than one notch in a book edge. I have therefore provided means coordinated with the operation of the aforesaid actuator to feed a book automatically through successive steps of any desired length; so that any desired notches may be cut, one after another, in the same book.

Figure 16:
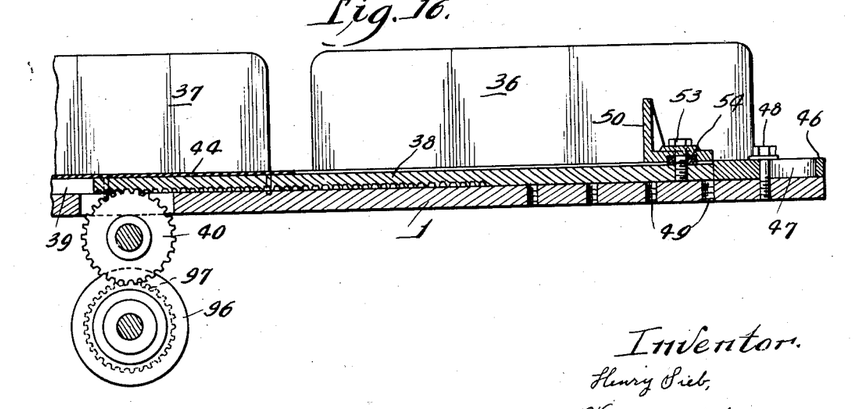
Fig. 16 is a vertical section, on a plane containing the longitudinal center line of the ratchet feed bar, through the bar and its immediate support.
Figures 17, 18, 19, 20:
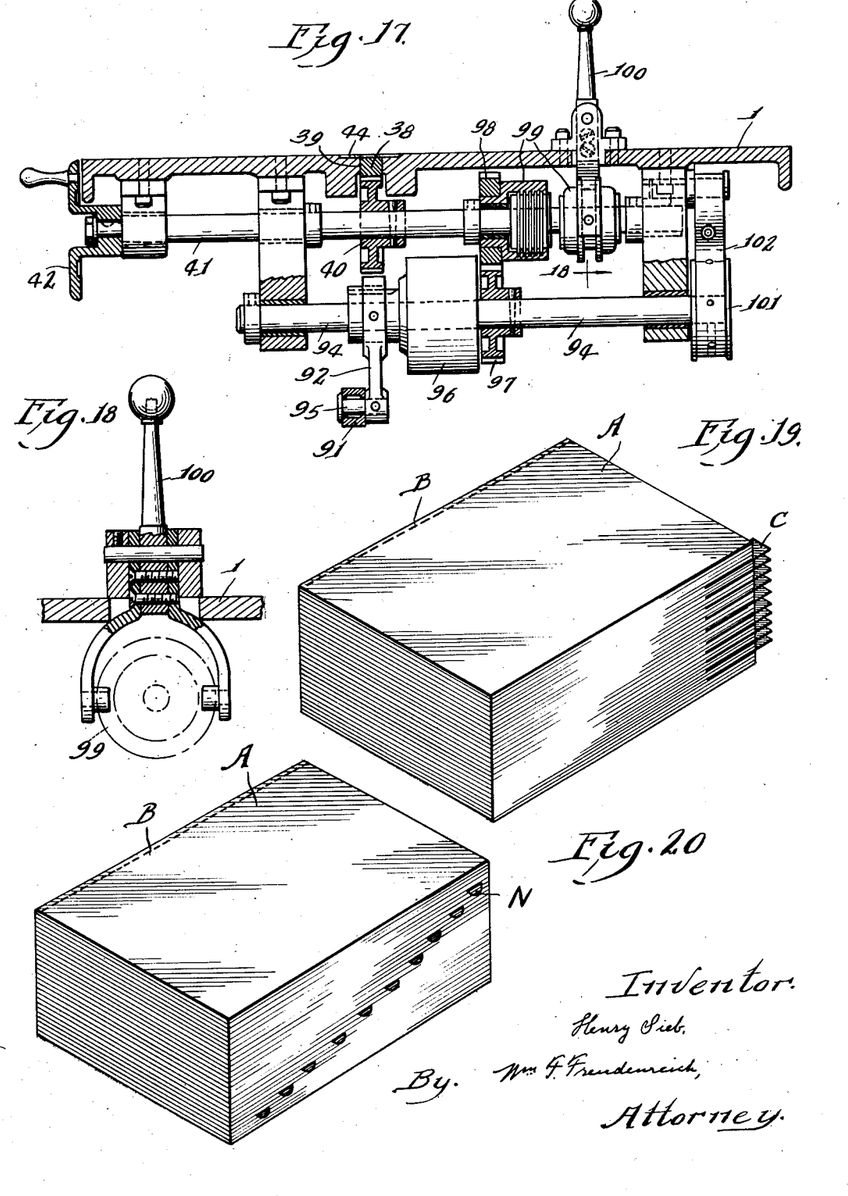
Fig. 17 is a section on line 17—17 of Fig. 12.
Fig. 18 is a section, on a larger scale, on line 18—18 of Fig. 17, showing only what is approximately in the plane of the section.
Fig. 19 is a perspective view of a book provided with markers to indicate the places at which the book is to be opened in cutting the desired notches.
Fig. 20 is a view similar to Fig. 19, showing the book after the notches have been cut.

The immediate feeding means for books being operated upon is a rack bar 38, which is set in a groove 39 that extends throughout the length of the bed or table in position to underlie books that are being cut. As best shown in Figs. 16 and 17, this rack bar is driven by a pinion 40 fixed on a shaft 41 that lies beneath and is hung from the bed or table so as to extend rearwardly from the front of the machine. On the front end of this shaft is a hand wheel 42 for manually turning the same. Groove 39 is provided with a cover plate 44 for about one half of its length, namely that half beyond the cutting point; the top of the bed or table being recessed to receive the plate and leave the top of the table smooth. This plate, being held down by screws 45, in turn holds the rack bar down. In the groove, at the outer end of that portion left open, is an elongated stop block 46 having therein a slot 47 that extends lengthwise thereof. This block may be fastened to the table by a screw 48 that extends through the slot into any one of a series of holes 49 opening into the table through the bottom of the groove and spaced apart from each other lengthwise of the groove; the spacing of these holes being about equal to the length of slot 47. This permits the stop to be adjusted very accurately to arrest the movement of the rack bar toward that end of the table at any point along a considerable section of the groove.

The rack bar is adapted to be equipped with a suitable shoe, at the end which meets the stop just described, to engage a book and push it ahead and, preferably, also to hold the book against guides 36 and 37 while it is being cut. The shoe 50 which I have illustrated is L-shaped. In the short arm of the L is a longitudinal slot 51 while in the under side thereof is an undercut groove 52 registering with and wider than the slot. On top of the rack, near the end, is fixed a cross piece 54 that constitutes a key to enter keyway or groove 52. The long arm of the shoe has near its free end a roller 55 that is adapted to rest on the table and provide a rolling support for the shoe as it is carried along by the rack. Slot 51 permits the shoe to be adjusted to fit any width of book within limits determined by the length of the slot; whereas stop block 46 serves initially to position a book of any length in position to have the first notch cut in the same at any desired point in the length of the book. Shoes may, of course, be made in various sizes to avoid the necessity of using a big, heavy shoe for notching small books.

The power driven means for operating both the rack bar and actuator 14 will now be described.

Figures 1, 1A:
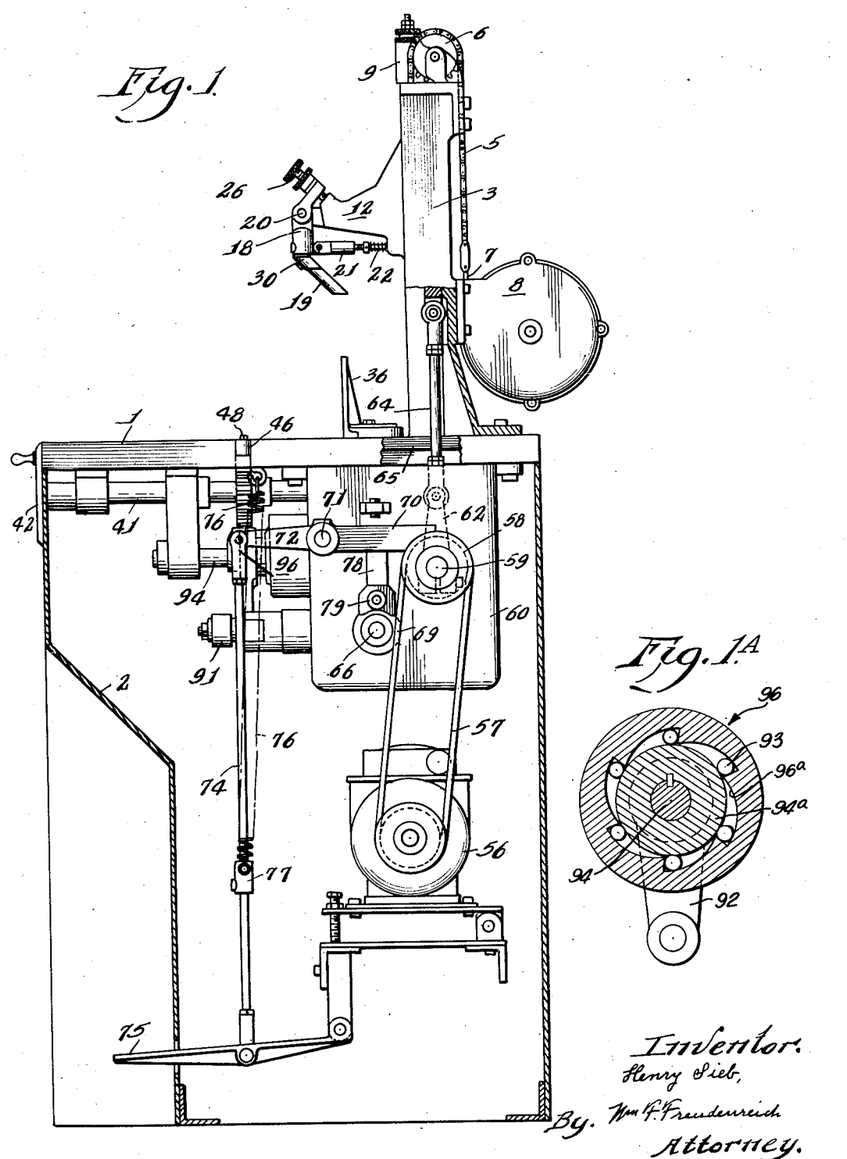
Figure 1 is an end view of a machine embodying the present invention, parts being in section.
Fig. 1A is a section, on an enlarged scale, through the one way clutch for driving the rack bar which moves the books ahead.
Figures 2, 3, 4, 5:
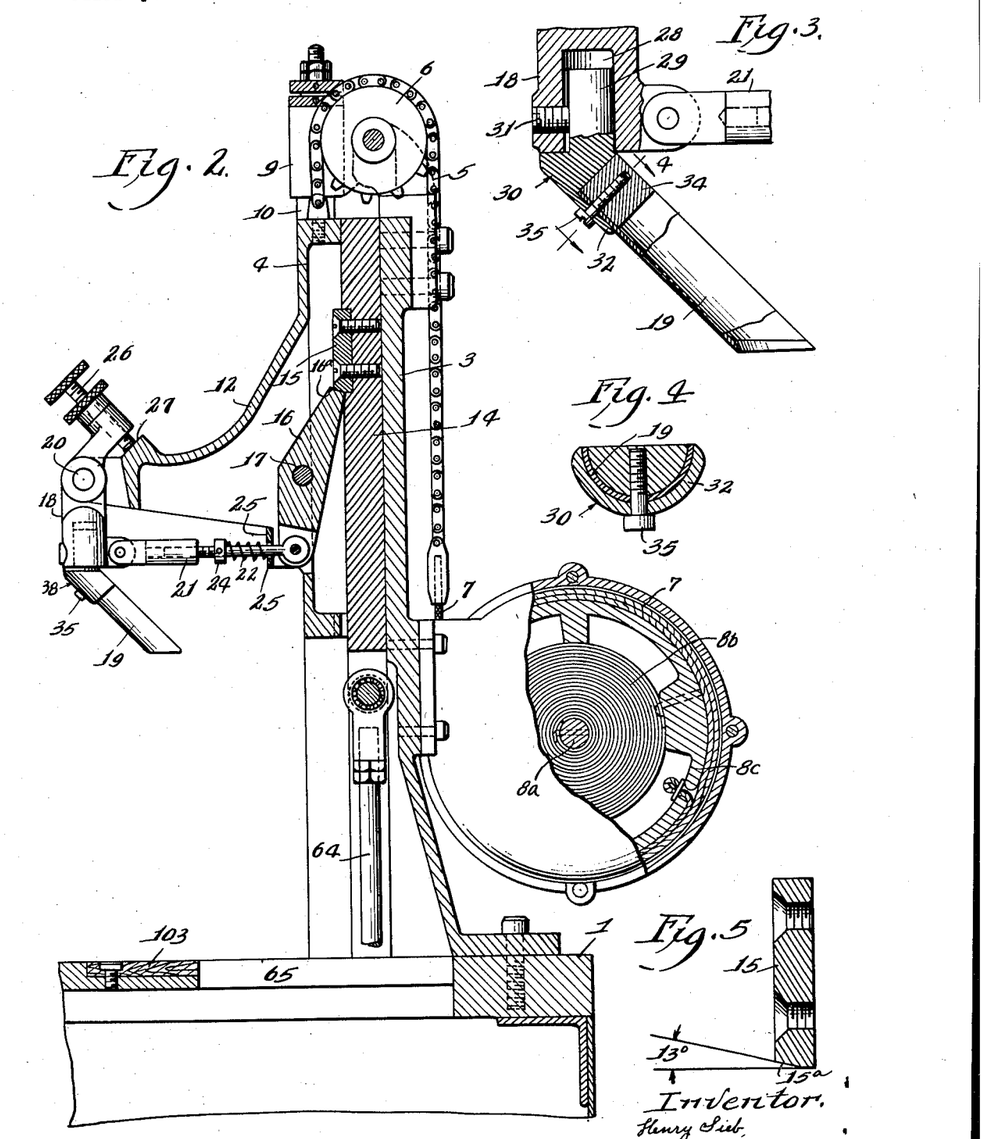
Fig. 2 is a vertical, transverse section through the cutting mechanism, with the parts in the same positions as, but on a larger scale than, in Fig. 1.
Fig. 3 is a view, partly in section and partly in elevation, on a still larger scale, showing the cutting knife and a fragment of the holder therefor.
Fig. 4 is a section on line 4—4 of Fig. 3.
Fig. 5 is a vertical section through the latch plate on the vertically slidable actuator.

As shown in Fig. 1, there is within the cabinet base of the machine a suitable electric motor 56 which, through a belt 57, drives mechanisms mounted on the under side of the bed or table. The belt runs over a pulley 58 loose on one end of a shaft 59 that extends through a gear housing 60 and is disposed lengthwise of the machine. A clutch 61 is interposed between the shaft and the pulley. On the other end of this shaft is a crank arm 62 from which a connecting rod 64 extends to the lower end of actuator 14; the connecting rod passing up through an opening 65 in the table below the column 3. Thus, for each revolution of shaft 59, the actuator for the cutter head makes a complete up stroke and a complete down stroke. In housing 60 is a shaft 66 that is parallel to shaft 59 and turns at the same speed as the latter through intermeshing like gears 67 and 68 thereon. On shaft 66, in line with clutch 61, is a cam 69. Clutch 61 is controlled by a radial arm 70 fixed at one end to one end of a shaft 71 that extends through the housing parallel to the other two shafts, 59 and 66. On the other end of shaft 71 is another radial arm 72. The free end of arm 72 is connected to a rod 74 that extends down to a treadle 75 that protrudes through the front wall of the cabinet. A tension spring 76, fastened at its upper end to the table and at its lower end to a collar 77 on rod 74, normally holds the rod and treadle raised as in Fig. 1. Clutch-operating arm 70 has a strut element 78 fixed thereto and extending down into the vicinity of cam 69. On the lower end of this strut is a cam roller 79 that rides on the cam. When arm 70 is in the position shown in Fig. 1, the clutch is out and cam roller 79 is on the low spot on cam 69. As soon as the treadle is pressed down, the clutch takes hold and turns shaft 59 and, consequently, shaft 66. The cam turns with shaft 66, bringing the high part thereof under the cam roller and preventing arm 70 from dropping when pressure on the treadle is released. Cam 69, being simply a disc with a peripheral notch for a low point, consequently holds the clutch releasing arm raised until shaft 59 completes a revolution that started with the depression of the pedal.

There is mounted in housing 60 a short shaft 80 that is at right angles to shaft 66 and one end of which protrudes from the housing. Intermeshing bevel gears 81 on these shafts cause shaft 80 to turn in unison with shafts 59 and 66 and at the same speed. On the end of shaft 80 that is outside the housing is a crank arm 82 that contains a wide, deep groove 84 extending throughout the length thereof. In the groove, at the outer end of the arm, is fixed a block 85. Slidable in the groove is a second block 86. A long screw 87 extends through both blocks 86, lengthwise of the groove; the same being in screwthreaded relation to block 86 and being smooth throughout that portion contained within block 85. A head 88 on the screw, beyond the outer end of block 85, and a collar 89 fixed to the screw at the inner end of that block, while allowing the screw to turn freely, hold it against lengthwise movement on the arm. Therefore, when the screw head is turned, block 86 will be moved along the groove in one direction or the other. Block 86 carries a journal 90 that projects outwardly parallel to shaft 80, the same serving as a crank pin to drive a connecting rod 91 that is journalled thereon and extends lengthwise of the machine. This connecting rod reaches to a crank arm 92 loose on a shaft 94 just below shaft 41, as shown in Fig. 17; a crank pin 95 connecting the rod and arm together. This crank arm is fastened to the casing 96 of any conventional one-way clutch surrounding shaft 94. Such a clutch is shown in Fig. 1A, wherein shaft 94 is surrounded by, and has affixed thereto, a thick sleeve of bushing 94ª, enclosed within the clutch casing; the clutch casing being loose on the shaft. The interior of the casing is recessed to provide a series of little pockets or chambers open on the sides toward the shaft and each containing a roller 93 that bears against the shaft. Each pocket or chamber has a cam surface 96ª that wedges the corresponding roller against the shaft when the casing is turned in one direction, while leaving the roller free to roll on the shaft when the casing is turned in the other direction. In other words, when the connecting rod moves lengthwise in one direction it turns shaft 94 through an angular distance that depends on the adjustment of the crank pin at the other end of the rod; whereas, on the return stroke of the rod, shaft 94 stands still. It will thus be seen that because each of the connecting rods 91 and 64 makes a complete working stroke and for each revolution of main shaft 59, the rack bar will be moved through a predetermined distance during each operating cycle of the notch cutting mechanism, provided that shaft 94 and 41 are geared together to turn at the same speed. But, since the power driven means does not return the rack bar to its starting point, gear wheel 97 on shaft 94 is made to mesh with a like gear wheel 98 that is loose on shaft 41; this latter gear wheel being fixed to a casing forming part of a clutch mechanism 99 between the gear wheel and shaft 41. This clutch mechanism is controlled by a hand lever 100 that rises above the top of the table beside the upright or column 3. This clutch mechanism, like the other, is of a conventional type, a disc clutch being shown.

In order that the shaft 94 shall not overrun when clutch 96 lets go, I provide it with a brake drum 101, partially surrounded and gripped by a brake band 102; the braking action being sufficient to stop the shaft instantly upon release of the clutch.

The notch that is being cut in Fig. 6 is through a group of leaves at the upper side of a thick book, so that the cutter does not come near the table. However, when cutting notches much nearer the table, the cutting edge may come in contact with the latter. Therefore in order to avoid damage to the knife, I place a wood inset 103 in the table in the area that may be reached by the knife. This inset may be quickly replaced if it be damaged.

A substantial part of the operation of the machine has been explained in connection with the description of its structural features, and the further discussion of the operation will therefore be confined to the manner of making plural notches in books of whatever size they may be.

Books are composed of "sections," those for each book being placed in stack formation and stitched together at the edges which are to form the back edge of the book; all edges being square at the time of cutting the notches. When a lot of like books are to be notched, a guide shoe of the proper size is attached to the rack of the machine and, with a book lying on the support or table, the shoe is adjusted to hold the book in engagement with guide 36. The rack is then adjusted lengthwise, by hand, to bring the book into the proper position for cutting the notch that is nearest the advance edge of the book when the latter is fed step by step through the cutting zone; clutch 99 having first been released. The clutch lever 100 is then shifted to couple the rack to the power drive means. The stroke of connecting rod 91 is adjusted to cause the rack to be moved through a step exactly equal to the distance desired between consecutive notches, measured from center to center. If the proper cutting knife is not already in the holder, one is inserted and the machine is ready for use.

Each book, before it is placed in the machine, has markers inserted between its sections; the markers being caused to protrude, from that edge of the book which is the only edge not in contact with a guide or a shoe, and form tabs to facilitate the folding back of one section after another as the notching proceeds. In Fig. 19 there is illustrated a book A stitched along one edge, at B, and having little pieces C of cardboard or the like inserted between sections. On the assumption that there are ten notches to be cut, ten of these strips are shown. In Fig. 19 the observer is looking at the edge which faces toward the back of the machine away from the operator, and is engaged with the longitudinal stationary guides 36 and 37. With this book properly located in position for receiving the first cut, the operator places a finger under the uppermost tab and slides it back under the same, while lifting it, until he is able to flip back the whole upper section; the marker being dropped to the floor. The treadle is then pressed down momentarily and a cycle of operations thus started continues through one complete cycle. In other words, starting with the cutter head and the actuator up as in Fig. 2, the head moves down a little past the position that it has assumed in Fig. 6, cutting a notch N and tripping the latch. Thereupon the head is rapidly pulled up to its normal, raised position and remains there while the actuator completes its down stroke and then moves up again to latch itself to the head. The controlling cam 69 has now completed a revolution and allows the clutch that drives the main shaft 59 to release automatically.

The mechanisms are so timed that the rack bar is moved ahead one step during the up stroke of the actuator for the head, namely, at a time when there is nothing to interfere with the free advance of the book. This properly locates the book for cutting the second notch. The operator then flips back the second book section and again presses the pedal down, causing the cycle to repeat itself. This process is repeated until all notches have been cut. After all of the notches have been cut, the operator removes the book, shifts clutch lever 100 to unclutching position and, by turning hand wheel 42, moves the rack back until it strikes the stop block 46; whereupon the machine is ready to receive the next book and cut the first notch upon depression of the treadle.

It will thus be seen that notch cutting can be done very accurately and with the certainty of having uniformity of product throughout an indefinite number of books of the same kind. It will also be seen that by providing merely various sizes and shapes of cutting knives, an infinite variety of notching for books of all sizes and kinds is made possible by my machine. It will also be seen that one of the ways in which notching can be varied is by adjusting the set screw 26 and connecting rod 21 to vary the initial angular position of the knife and, therefore, the distance from the book edge at which the start of a notch begins. Likewise, varying the initial compression of the latch spring 22 has an influence on the character of the notch; compression of this spring depending on the position of the adjustable collar 24 on rod 21.

It will further be seen that speed of operation, with no harmful effects, is achieved by braking the shaft that is turned step by step to move the rack bar, and by providing a cushion for the sliding head to permit the use of a powerful spring to raise it quickly without causing objectionable shocks.

While I have illustrated and described with particularity only a single preferred form of my invention, I do not desire to be limited to the exact details thus illustrated and described, but intend to cover all forms and arrangements that come within the definitions of my invention constituting the appended claims.

I claim:

1. In a machine of the character described, a support for a flat-lying book, a head mounted for movements from a normal, raised position toward the support, a vertically movable actuator near the head and having thereon a downwardly facing shoulder, a movable latch member on said head positioned normally to underlie said shoulder to connect the actuator and the head together for downward movements in unison with each other, a spring-held rocking cutting element movably mounted on the head and connected to the latch for cutting a notch in an edge of the book and then releasing the head from the actuator by moving the latch member clear of said shoulder when the head is moved down far enough to drive the cutting element into the book, and yieldable means connected to the head to return the same to its raised position when unlatched from the actuator.

2. In a machine of the character described, a support for a flat-lying book, a head mounted for movements from a normal, raised position toward the support, a vertically movable actuator near the head and having thereon a downwardly facing shoulder, a spring-held swinging latch member so disposed on said head that it tends constantly to project into the path of said shoulder and is yieldable upwardly, so that, when the actuator moves up from below, it may pass the latch member and the latter may then snap back into its normal position in the path of the shoulder, a cutting element movably mounted on the head and connected to the latch member for cutting a notch in an edge of the book and then swinging the latch member clear of said shoulder whenever the head is moved down far enough to drive the cutting element through the book, and yieldable means connected to the head to return the same to its raised position when unlatched from the actuator.

3. A machine as set forth in claim 2, wherein means are provided to reciprocate the actuator through a stroke of such length that the head is carried thereby, unless unlatched at some intermediate point, from the normal raised position to a lower position in which the cutting element is close to the support for the block.

4. In a machine of the character described, a support for a flat-lying book, a head movable from a normal raised position toward said support, a spring-held rockable device on the head to cut a notch in an edge of the book and simultaneously change its angular position on the head whenever the latter is moved down far enough to cause the device to come in contact with the top side of the book, an actuator to move head downward, a connection between the head and the actuator to cause them to move in unison when the actuator makes a down stroke, said connection including means controlled by the rockable device to free the head from the actuator when the rockable device has undergone a predetermined change in angular position, and yieldable means connected to the head to return the same to its raised position when freed from the actuator.

5. In a machine of the character described, a support for a flat-lying book, a head movable down from a normal raised position toward said support, a spring-held rockable device on the head to cut a notch in an edge of the book and simultaneously change its angular position on the head when the latter is moved down far enough to press said device against the top side of the book, an actuator, a latch, including a movable latch member on the head, that connects the head and the actuator for downward movements in unison with each other, said latch member being connected to said device so as to be tripped by the same and free the head from the actuator when the device undergoes a predetermined change in angular position, and yieldable means connected to the head to return the same to its raised position when free from the actuator.

6. In a machine of the character described, a support for a flat-lying book, a head movable vertically from a normal raised position toward the support, a device mounted on the head to rock about a horizontal axis and in a vertical plane that is transverse to the edge of the book in which one or more notches are to be cut, a cutter on said device, a spring normally holding said device in such a position that upon descent of the head the cutter engages the upper side of the book a short distance from said edge and thereafter said device rocks in the direction to cause the cutter to execute a cutting stroke downwardly and laterally through said edge, means connected to the head and acting constantly in a manner to lift the head into said raised position and yieldingly hold it there when the head is otherwise unconstrained, an actuator to move the head, including a latch member connected to said device, to cause the actuator and the head to be disengaged from each other when said device has rocked far enough to cause the cutter to complete a cutting stroke.

7. A machine as set forth in claim 6, wherein the parts of the connection between the head and the actuator are so constructed that the actuator fits slidably in the head, and wherein the latch is yieldable in the direction to allow the actuator to move upward relatively to the head.

8. In a machine of the character described, a support for a flat-lying book, a slide mounted beside the support for vertical movements, means to move the slide up and down through a predetermined distance, a head mounted beside the slide for vertical movements independently of the slide, a device pivoted to the head in front of and at a substantial distance from the slide for rocking movements in a vertical plane intersecting the slide, said slide having a downwardly facing shoulder, a movable latch member on the head connected to the said device for actuation thereby, said latch member having an upwardly facing shoulder which, in one extreme angular position of said device, extends across the path of the shoulder on the slide, a spring yieldingly holding said device in said extreme angular position, means yieldingly holding the head in a raised position, and a cutter on said device in position first to engage the book on the upper side and a short distance from the edge in which a notch is to be cut, when the head is moved down, and then to cut downwardly and laterally through said edge while said device rocks out of said extreme angular position due to the resistance offered by the book to the cutter, the angle through which said device rocks during the cutting stroke being sufficient to withdraw the shoulder on the latch member laterally from engagement with the shoulder on the slide and thereby free the head from the slide at the end of the cutting stroke.

9. In a machine of the character described, a support for a flat lying book, a guide extending along the support to engage the book along the edge to be notched, a feed element to move the book step by step along the guide, an upright rising from the support in rear of said feed element, a head mounted for vertical movements on said upright and having a part projecting forwardly over the zone in which the book lies, a device pivoted to the forward end of said projecting part of the head for rocking movements in a vertical plane at right angles to the guide, an actuator movable up and down on said upright and having on the front side a downwardly facing shoulder, a latch member movably mounted on the head, a connection between said device and the latch member, a spring yieldingly holding said device in a position to cause the latch member to project into the path of said shoulder, and a cutter on the lower part of said device in position to strike the upper side of the book near said edge when the head is moved down and then act to cut a notch through said edge of the book and then rock said device sufficiently to release the latch member from the said shoulder.

10. In a machine of the character described, a support for a flat lying book, a guide extending along the support to engage the book along the edge to be notched, a bar slidably mounted in the support in front of and parallel to the guide to move the book along the guide, an upright rising from the support in rear of said slidable bar, a head mounted for vertical movements on said upright and having a part projecting forwardly over the bar, a device pivoted to the forward end of said projecting part of the head for rocking movements in a vertical plane at right angles to the guide, an actuator movable up and down on said upright and having on the front side a downwardly facing shoulder, a latch member movably mounted on the head, a connection between said latch member and said device, a spring yieldingly holding said device in a position to cause the latch member to project into the path of said shoulder, a cutter on the lower part of said device in position to strike the upper side of the book near said edge when the head is moved down and cut a notch and then rock said device sufficiently to release said latch member from the said shoulder, and said guide containing a gap opposite the cutter to permit the latter to swing rearwardly beyond the book edge resting against the guide.

11. In a machine of the character described, a support for a flat lying book, a guide extending along the support to engage the book along the edge to be notched, a slidable rack bar on the support in front of and parallel to the guide to move the book step by step along the guide, an upright rising from the support in rear of said bar, a head mounted for vertical movements on said upright and having a part projecting forwardly over said bar, a device pivoted to the forward end of said projecting part of the head for rocking movements in a vertical plane at right angles to the guide, an actuator movable up and down on said upright and having on the front side a downwardly facing shoulder, a latch member movably mounted on the head, a connection between said latch member and said device, a spring yieldingly holding said device in a position to cause the latch member to project into the path of said shoulder, a cutter on the lower part of said device in position to strike the upper side of the book near said edge when the head is moved down and then act to cut a notch through said edge of the book and then rock the carrier sufficiently to release said latch member from the said shoulder, a shaft having thereon a pinion in mesh with the rack bar, power mechanism to turn said shaft step by step in one direction only, a manually operably clutch connecting said mechanism to said shaft, and a member on the shaft for turning it manually when the clutch is released.

12. In a machine of the character described, a support for a flat-lying book, a head, means for guiding the head for movements vertically from a raised position toward the support, a carrier mounted on the head to rock about a horizontal axis and in a vertical plane that is transverse to the edge of the book in which a notch is to be cut, a cutter on the carrier, a spring normally holding the carrier in such a position that upon descent of the head the cutter engages the upper side of the book a short distance from said edge and thereafter the carrier rocks in the direction to cause the cutter to execute a cutting stroke downwardly and laterally through said edge, and means to move the head down.

13. In a machine of the character described, a support for a flat-lying book, a long guide on and extending lengthwise of said support, a head movable vertically from a normal raised position toward the support, a carrier mounted on the head to rock about a horizontal axis and in a vertical plane that is transverse to the edge of a book on the support held against said guide, a cutter on the carrier, a spring normally holding the carrier in such a position that upon descent of the head the cutter engages the upper side of the book a short distance from said edge and thereafter the carrier rocks in the direction to cause the cutter to execute a cutting stroke downwardly and laterally through said edge, means to move the head down, a groove in the top of said support near and parallel to said guide, a rack bar in said groove and slidable along the same, a shoe on the rack bar to hold the book against said guide and to engage one end edge of the book to push it along the guide, and means to move the rack bar lengthwise.

14. A machine as set forth in claim 13, wherein there is a shaft provided with a pinion meshing with the rack bar, a hand wheel for turning the shaft, a power driven means to turn the shaft step by step in one direction only, and a manually operable clutch to connect said power driven means to the shaft.

HENRY SIEB.

REFERENCES CITED

The following references are of record in the file of this patent:

UNITED STATES PATENTS

| Number | Name | Date |
| --- | --- | --- |
| 383,252 | Rothe | May 22, 1888 |
| 399,250 | Donnell | Mar. 12, 1889 |
| 453,103 | Braidwood | May 26, 1891 |
| 464,438 | Maclachlan | Dec. 1, 1891 |
| 853,087 | Johnson | May 7, 1907 |
| 1,381,814 | Farkas | June 14, 1921 |
| 2,078,656 | Erickson | Apr. 27, 1937 |